C. WRAYGE, Jr.
NUT LOCK.
APPLICATION FILED MAY 20, 1918.

1,321,270.

Patented Nov. 11, 1919.

Christian Wrayge Jr.
Inventor
By Geo. P. Kimmel
Attorney

UNITED STATES PATENT OFFICE.

CHRISTIAN WRAYGE, JR., OF CASS LAKE, MINNESOTA.

NUT-LOCK.

1,321,270. Specification of Letters Patent. Patented Nov. 11, 1919.

Application filed May 20, 1918. Serial No. 235,564.

*To all whom it may concern:*

Be it known that I, CHRISTIAN WRAYGE, Jr., a citizen of the United States, residing at Cass Lake, in the county of Cass and State of Minnesota, have invented certain new and useful Improvements in Nut-Locks, of which the following is a specfication.

This invention relates to new and useful improvements in nut locks and the primary object of the invention is to provide a new and improved type of nut lock which includes a split spring rocking ring positioned between the nuts on a bolt which is engageable with said nuts to prevent the loosening of the outer locking nuts and securely hold the same in engagement with the bolt.

Another object of the invention is to provide a lock nut of this character which includes a split locking ring engageable with the nuts, said ring having a coöperative engagement with the bolt, to securely hold the ring into engagement therewith at various positions along the length of said bolt.

A further object of the invention is to provide a device of this character which is easily and simply constructed, inexpensive to manufacture, and one which will be very efficient in operation.

With these and numerous other objects in view, my invention consists of the novel features of construction, combination and arrangement of parts which will be herein referred to and more particularly pointed out in the specification and claim.

In the accompanying drawings.

In describing my invention, I shall refer to the drawings in which similar reference characters designate corresponding parts throughout the several views.

The numeral 1 designates the shank of a bolt, provided with the usual type of head 2 and the shank of the bolt 1 is provided with a longitudinally extending groove 3 along the threaded periphery thereof for a purpose to be hereinafter more fully described.

Figure 1:
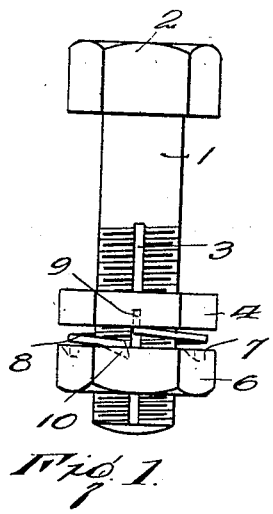
Figure 1 is a side elevation of the nut lock applied.
Figure 2:
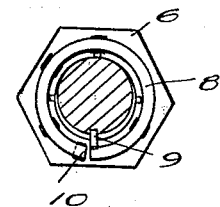
Fig. 2 is a transverse section through the same.

Adapted to be positioned on the threaded shank of the bolt is the inner nut 4, which is provided on its outer face adjacent the inner edge and communicating therewith a plurality of sockets 5, said sockets being adapted for alinement at times with the groove 3 in the bolt. A locking nut or outer nut 6 is adapted to be positioned on the bolt and the inner face of the same is provided with a plurality of circumferentially extending spaced teeth 7 for a purpose to be hereinafter more fully described. Adapted to be positioned between the inner and outer faces of the nuts 4 and 6 is a split spring locking ring 8 having on its opposite ends oppositely turned lugs 9 and 10, the lug 9 being adapted to be positioned in one of the sockets 5, while the lug 10 is for engagement with the teeth 7 on the inner face of the locking nut 6. The lug 9 is so formed that a portion thereof projects inwardly, and the same is adapted to be positioned in the groove 3 of the bolt 1 at the same time it is engaged with one of the sockets 5 in the outer face of the nut 4. The construction of this lug is clearly shown in Fig. 2 of the drawing, and it is obvious that when the same is positioned within the socket, the same also coöperatively engages with the bolt to lock the ring securely in position. As the ring 8 is a spring split ring, it is obvious that upon tightening the locking nut into engagement with the outer lug thereof a spring connection between the bolt and nut will be formed that will absolutely prevent the nut from working loose on the bolt.

Figure 4:
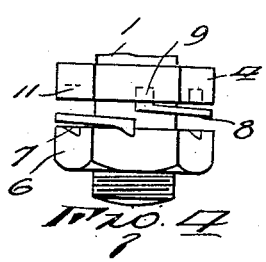
Fig. 4 is a detail side elevation of a slightly modified form of lock nut.
Figure 3:
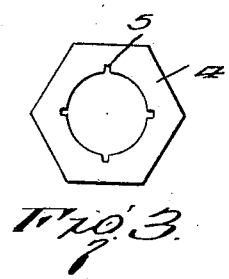
Fig. 3 is a plan view of the front face of the inner nut.
Figure 5:
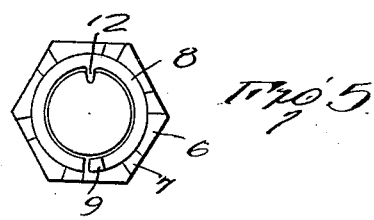
Fig. 5 is a vertical transverse section through the same.

In Figs. 4 and 5 of the drawings I have shown a slightly modified form, wherein the inner nut 4 is provided with a plurality of circumferentially spaced sockets 11 on its outer face, but said sockets are positioned midway between the inner and outer edges and do not communicate with the inner edge of said nut as in the first form of the device. A slightly different form of lug on the inner end of the ring 8 is employed, said lug being adapted to be positioned in one of the sockets when the split locking ring is positioned around the bolt. The locking ring in this form is provided with an inwardly projecting lug 12 at a point opposite the split portion thereof, and said lug is adapted to be positioned in the groove 3 in the shank of the bolt 1. This will lock the ring in position and accomplish the same purpose as that described in the first form of this device, only employing a slightly different construction.

From the foregoing description, taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having fully described my invention, what I claim as new and desire to secure by Letters Patent, is:

The combination with the threaded end of a bolt having a longitudinal groove therein, of an inner nut provided with a threaded bolt engaging opening and also formed in its opening with oppositely and vertically disposed sockets any one of which is adapted for alinement with the groove when the nut is engaged on the bolt, a split ring encircled about the bolt and having its free portions disalined, a lug formed on one end of the ring and designed to be engaged with the groove in the bolt and the adjacent sockets to prevent relative movement between the bolt and the inner nut, another lug formed on the opposite end of the ring, and an outer nut adjustably engaged on the bolt and having its inner face formed with a circle of teeth any one of which is engaged by the last mentioned lug so that when the outer nut is fully adjusted the locking ring will be held against movement while the last mentioned lug in turn will prevent retrograde movement of the outer nut.

In testimony whereof, I affix my signature hereto.

CHRISTIAN WRAYGE, Jr.

Copies of this patent may be obtained for five cents each, by addressing the "Commissioner of Patents, Washington, D. C."